United States Patent [19]

Stuemky

[11] 4,244,608
[45] Jan. 13, 1981

[54] FEMALE COUPLING WITH STAPLE LOCK

[75] Inventor: Robert E. Stuemky, Elizabeth, Colo.

[73] Assignee: The Gates Rubber Company, Denver, Colo.

[21] Appl. No.: 17,675

[22] Filed: Mar. 5, 1979

[51] Int. Cl.³ .............................................. F16L 37/12
[52] U.S. Cl. .................................. 285/305; 24/211 L
[58] Field of Search ................ 285/305, 321; 403/155; 24/211 L

[56] References Cited

U.S. PATENT DOCUMENTS

| 2,021,241 | 11/1935 | Mall | 285/305 X |
| 2,092,243 | 9/1937 | Breese | 285/305 X |
| 3,534,988 | 10/1970 | Lindsey | 285/305 |
| 3,753,582 | 8/1973 | Graham | 285/305 |
| 3,929,356 | 12/1975 | DeVincent et al. | 285/305 |
| 4,009,896 | 3/1977 | Brewer | 285/305 |

FOREIGN PATENT DOCUMENTS

| 2028711 | 12/1971 | Fed. Rep. of Germany | 285/305 |
| 2362527 | 6/1975 | Fed. Rep. of Germany | 285/305 |
| 2266091 | 10/1975 | France | 285/305 |

OTHER PUBLICATIONS

IBM, Technical Disclosure Bulletin, vol. 20, No. 9, Feb. 1978, pp. 3662, 3663.

Primary Examiner—Thomas F. Callaghan
Attorney, Agent, or Firm—H. W. Oberg, Jr.; Raymond Fink; Curtis H. Castleman, Jr.

[57] ABSTRACT

A female coupling adapted for use with prior art male stems of the collared type, the coupling having a stem-receiving bore and two substantially parallel slots that intersect circumference portions of the bore. Two leg members of a generally U-shaped staple are inserted in and reciprocally movable in the coupling slots. Leg members have facing, substantially centrosymmetrical slots that open with the intersecting circumference portions of the bore when the staple is in the open and unlocked position. Locking tab portions of the leg members intersect the bore at the intersecting circumference portions when the leg members are reciprocated to a lock position and a spring means interconnecting the leg members retain free ends of the leg members against the coupling.

7 Claims, 6 Drawing Figures

U.S. Patent  Jan. 13, 1981  4,244,608

FEMALE COUPLING WITH STAPLE LOCK

BACKGROUND OF THE INVENTION

The invention relates to pipe joints or couplings, but more particularly, the invention relates to a female coupling with a locking means of the staple type.

Quick-connecting couplings have widespread use in the hydraulic industry. This invention applies to quick-connecting couplings of the type that receives a male-stem fitting that is usually attached to each end of a hydraulic hose. The male stem has a collar for retaining it in a stem-receiving bore of the female coupling. A removable staple intersects the bore behind the male stem collar which locks the assembled pieces together.

One class of female coupling has a U-shaped staple that must be completely removed before the male stem can be inserted. A problem with this class of couplings is that the staples are easily lost and require constant replacement. Some staples have legs with outwardly projecting barbs that are biased against a female coupling for the purpose of retaining the staple to prevent unwanted dislodgement during use. The problem with this particular type of staple is that it is very difficult to remove as the ends of the staple must be forced together before it can be pried from a coupling.

Another class of a coupling uses a staple that has centrosymmetrical sector-shaped slots on its legs which face each other and constantly intersect a stem-receiving bore. A male stem with a chamfered collar is inserted in the bore and pressed against the slots spreading the legs of the staple and permitting passage of the collar. The legs snap together behind the collar to retain the stem. A problem with this type of coupling is that it is suitable only for low pressure applications. Also, a longitudinal force must be applied to the male end to effect coupling. In some applications, such pressure on the end of the hose may be difficult, if not impossible, to apply.

SUMMARY OF THE INVENTION

In accordance with the invention, a female coupling of the staple type is provided for use with collared male stems. The coupling has a body portion with a stem-receiving bore and two substantially parallel slots that intersect circumference portions of the bore. A generally U-shaped staple is reciprocally movable in the slots to define open and locked positions. In the open position, centrosymmetrical slots in leg portions of the staple are aligned with the bore to allow free entry of a male stem. In a closed position, lock tab portions of the staple are positioned to intersect the bore and extend behind a collar of an inserted stem. A spring member interconnects the leg portions of the staple to retain the legs against a portion of the coupling body near the slots to prevent inadvertent movement of the staple to the open position. Optionally, but preferably, protuberances are provided at free ends of the staple to retain the staple with the coupling body portion.

An object of the invention is to provide a coupling with a staple that may be retained with the coupling when the coupling is in the open position.

Another object of the invention is to provide a female-type staple coupling that is usable with prior art male stems of the collared type.

An advantage of the invention is that the staple may be easily actuated from an open to closed position but a spring member prevents accidental movement of the staple to the open position.

These and other objects and advantages of the invention will be apparent after reviewing the drawings and description thereof wherein.

DESCRIPTION OF PREFERRED EMBODIMENTS

Figure 1:
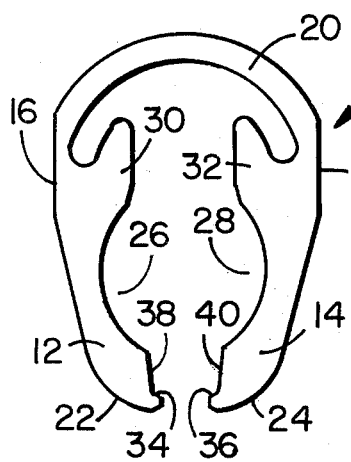
FIG. 1 is a front view of the staple of the invention.
Figure 2:
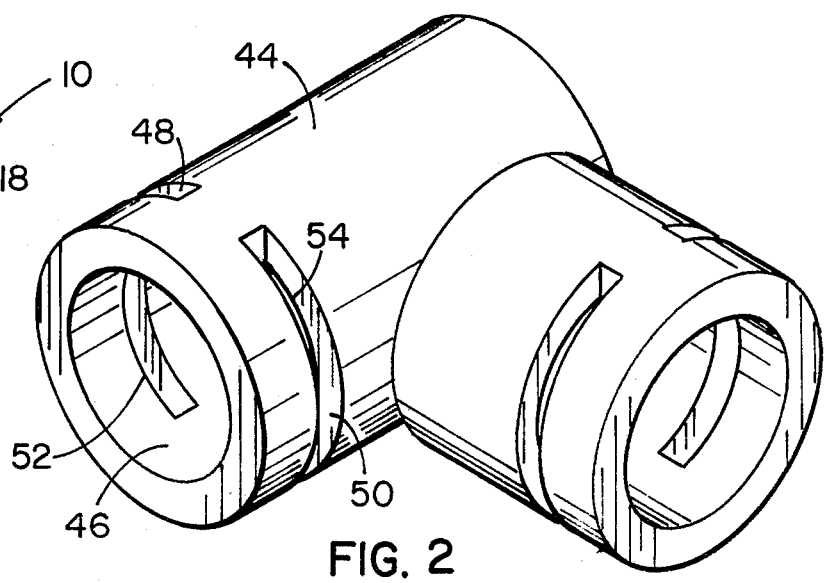
FIG. 2 is an isometric view of an ell-type fitting showing stem-receiving bores of the coupling and staple-receiving slots.
Figure 3:
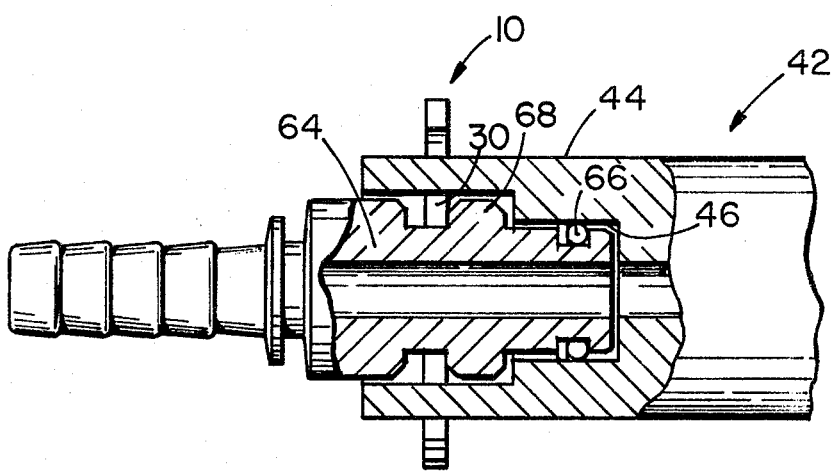
FIG. 3 is a partial cross-sectional view taken along the axis of the coupling showing the coupling of the invention assembled and locked with a prior art male stem.

Referring to FIG. 1, a staple 10 is provided which is generally U-shaped. Two generally parallel leg members 12, 14 are interconnected to each other at common ends 16, 18 by a spring means 20. The spring means can be separately attached to the leg members; but preferably, the spring is an integral part of the staple. The neutral position of the spring holds free ends 22, 24 of the leg members slightly together but it allows them to be spread apart. Substantially centrosymmetric slots 26, 28 having preferably an arcuate shape are formed in each leg member 12, 14 so that the slots face each other. A locking tab portion 30, 32 is provided on each leg member between the slot and interconnected, common ends 16, 18. Optionally, but preferably, the free ends of the leg members have stop protuberances 34, 36 and coupling engaging flat surface portions 38, 40 which face each other.

The coupling 42 has a body portion 44 with a stem-receiving bore 46. Two substantially parallel slots 48, 50 in the coupling form intersecting circumference portions 52, 54 in the bore. The chordal distance D between the slots is greater than the spacing between the free ends of the staple and smaller than the spacing between the common ends 16, 18 of the staple.

Figure 5:
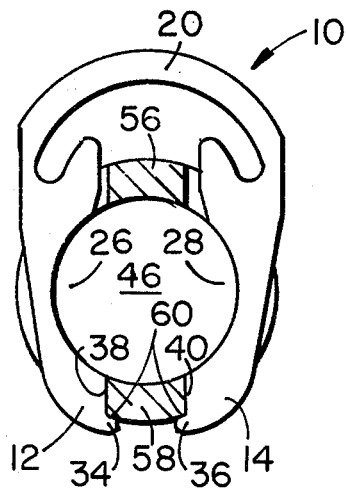
FIG. 5 is a view similar to FIG. 4 but showing the staple in the unlocked position.
Figure 6:
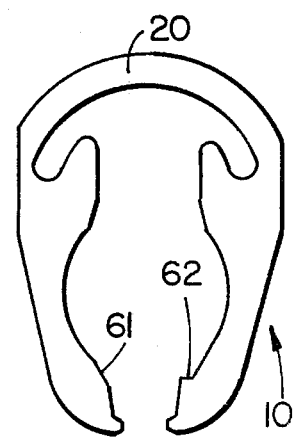
FIG. 6 is a view similar to FIG. 1 but showing alternate forms of the invention.

The staple is inserted in the slots by spreading apart the free ends 22, 24 of the leg members to clear the circumferential portions 56, 58 of the coupling between the slots. Once positioned, the stop protuberances 34, 36 prevent free extraction by abutting against an outer edge 60 of the coupling. Preferably, the stop protuberances are so located that they align the slots of the leg members with the bore of the coupling when the staple is in the open position (FIG. 5). The slots in the leg members open with the intersecting portions to provide a free bore for receiving a male stem. The flat surfaces 38, 40 frictionally engage the circumferential portion 58 of the coupling to frictionally hold the staple in the open position for easy insertion of a male stem.

Figure 4:
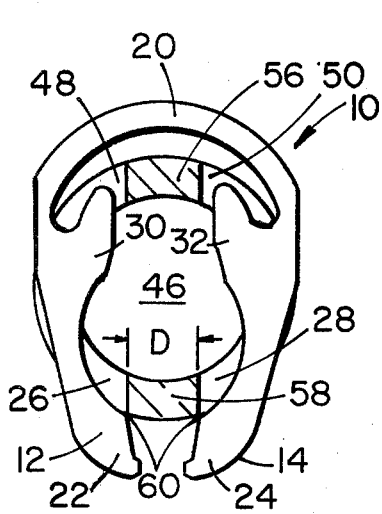
FIG. 4 is an axial view of the coupling taken at the staple receiving slots and showing the staple in the locked position.

In the locked position, the staple is reciprocated in the slots to the position as shown in FIG. 4. The locking tab portions 30, 32 intersect the bore 46 of the coupling to key with a collar of a male stem. The free ends 22, 24 of the leg members are snapped together by the spring means as the leg members clear the coupling body at the slots 26, 28. The slots hold the staple in the locked position. A slot may include a camming surface 61 that spreads the leg member when a force is applied to reciprocate the staple or a slot may have a locking notch 62 that requires a spreading force be applied before the staple may be reciprocated.

In use, the staple is placed in the unlocked position such as by applying a force to the ends of the leg members or by levering a screwdriver between the spring means and coupling body. A collared male stem 64 is positioned in the stem-receiving bore until it bottoms against a shoulder therein. An o-ring 66 retained on the stem forms a liquid seal between the male stem and female coupling. The staple 10 is placed in a locked position by simply applying a downward force against the spring means. This positions the locking tab portions 30, 32 behind the stem collar 68. The male end of the coupling is locked from removal until the staple is reciprocated to the open position.

The foregoing description is made for purpose of illustration only and is not intended to limit the scope of the invention which is to be determined from the appended claims.

What is claimed is:

1. A lock staple for use with a female coupling having a bore for receiving a collared male stem, the staple comprising:

two generally parallel leg members interconnected to each other at common first ends by a spring means for allowing common free ends of the leg members to spread apart, the leg members having substantially centrosymmetrical slots that face each other, and are dimensioned to provide a free bore in the coupling when aligned therewith, locking tab portions intermediate the first ends and slots which face each other and intersect diametrically unopposed portions of the bore when in a locking position, and coupling engaging surface portions that face each other intermediate the free ends and slots and engage the coupling when the slots are aligned with the bore.

2. The staple as claimed in claim 1 wherein the leg members are substantially flat.

3. The staple as claimed in claim 1 wherein the free ends of the leg members have facing protuberances for retaining the staple to the coupling, the protuberances located so as to engage a portion of the coupling and align the slots with the bore.

4. The staple as claimed in claim 1 wherein the staple is made of one piece.

5. The staple as claimed in claim 1 wherein the slots have an arcuate shape.

6. In a female coupling of the type having a staple for interlocking with a collared, male stem of an interfitting coupling, the improvement comprising:

a body portion having a stem-receiving bore and two substantially parallel slots intersecting circumference portions of the bore; and a lock staple comprising two generally parallel leg members interconnected to each other at common first ends by a spring means for allowing common free ends of the leg members to spread apart; the leg members inserted through and reciprocally movable in the slots; the leg members having substantially centrosymmetrical slots that face each other at the bore; locking tab portions facing each other intermediate the first ends and slot and wherein in an open position, the slots of the leg members are aligned with the intersecting circumference portions and provide a free bore, and in a closed position the tab portions of the leg members intersect portions of the bore; coupling engaging surface portions that face each other intermediate the free ends and slots and engage the coupling when the slots are aligned with the bore; and stop protuberances facing each other near and as an integral part of the free ends that engage the body portion in the open position and prevent free leg member extraction from the body portion and align the slots of the leg members with the intersecting circumference portions of the body.

7. The coupling as claimed in claim 6 wherein in the closed position, portions of the leg members at the slots engage portions of the coupling at the parallel slots preventing free extraction of the leg members.

* * * * *